Mar. 20, 1923.

G. W. R. HARRIMAN.
TRANSPORTATION MAP.
ORIGINAL FILED JUNE 23, 1916.

1,448,960.

2 SHEETS—SHEET 1.

INVENTOR
George W. R. Harriman
by Wright, Brown, Quinby & May
att'ys

Mar. 20, 1923.

G. W. R. HARRIMAN.
TRANSPORTATION MAP.
ORIGINAL FILED JUNE 23, 1916.

1,448,960.

2 SHEETS—SHEET 2.

INVENTOR
George W. R. Harriman by Wyte, Brown, Quinby & Hay
att'ys

Patented Mar. 20, 1923.

1,448,960

UNITED STATES PATENT OFFICE.

GEORGE W. R. HARRIMAN, OF MALDEN, MASSACHUSETTS.

TRANSPORTATION MAP.

Original application filed June 23, 1916, Serial No. 105,524. Divided and this application filed December 18, 1920. Serial No. 431,645.

*To all whom it may concern:*

Be it known that I, GEORGE W. R. HARRIMAN, a citizen of the United States, residing at Malden, in the county of Middlesex and State of Massachusetts, have invented new and useful Improvements in Transportation Maps, of which the following is a specification.

The invention hereinafter described and claimed relates to, and has for its object to provide, a transportation map having means for showing not only the locations and directions of channels or ways of travel and transportation, but also the length of such ways between any two points in their course, and the ownership of such as constitute property. A further object is to exhibit, in connection with localities and regions shown on the map, symbols conveying definite information in an intelligible manner of the predominating or other characteristics of said localities with respect to natural resources or products of manufacture, objects of trade, facilities and means for the transaction of business, for education, for recreation, or other facts.

The particular subject of this invention was originally disclosed and claimed in the application which resulted in my Patent No. 1,192,829, and subsequently in my prior application for patent filed June 23, 1916, Serial No. 105,524 as a division of said original application; and the present application is a division of the one filed June 23, 1916.

Figure 1:
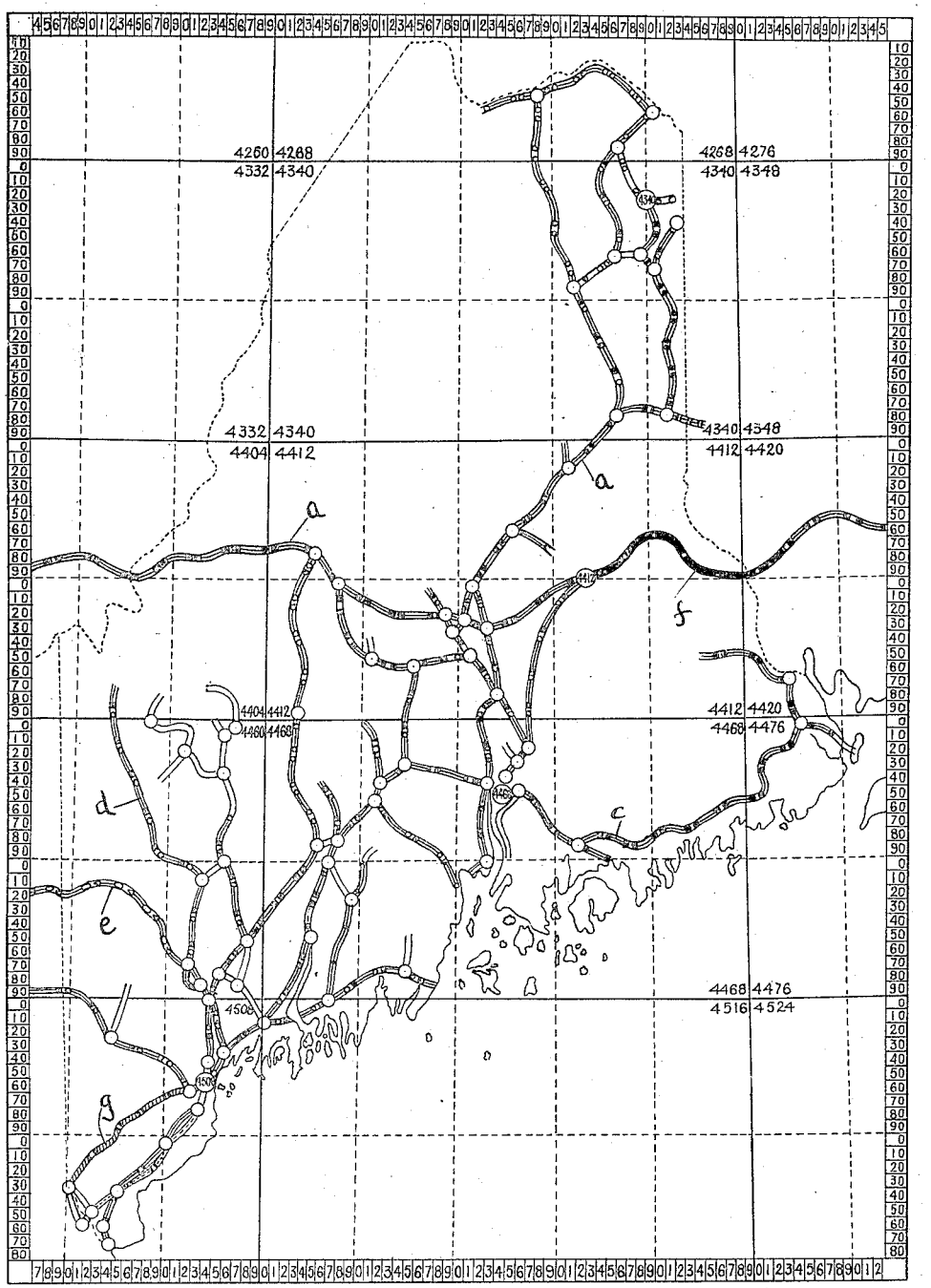
Figure 2:
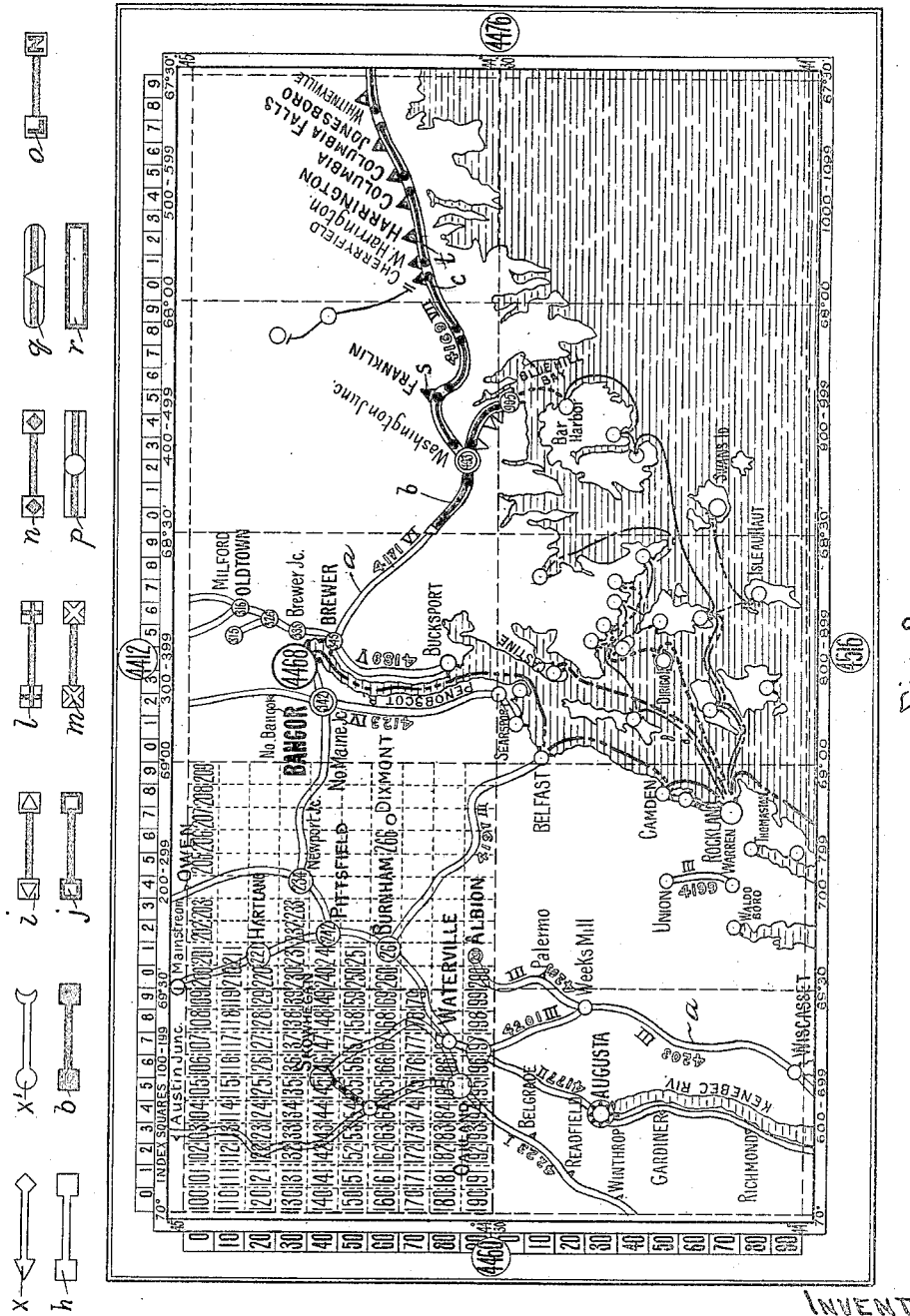
Figure 3:
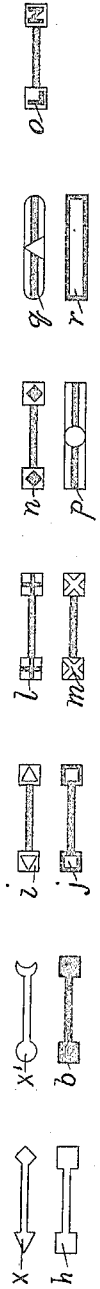

The following explanation of the invention is given in connection with drawings in which Figure 1 shows a map of a relatively large area of the earth's surface containing representations of railroad lines existing in the territory so illustrated; Figure 2 is a large scale map of a portion of the territory represented in Figure 1, and Figure 3 shows by way of illustration a few of the many symbols applied in accordance with this invention to represent distance and ownership in connection with lines of transportation.

Like reference characters indicate the same parts in all the figures.

In Figures 1 and 2 the lines to which the reference letter *a* is applied represent railroad lines existing in the territory shown in the maps, and applied to such representations are the symbols *b*, *c*, *d*, which designate length and ownership. Preferably the representation of the railroads is made by double lines and the symbols are applied in the spaces bounded by such double lines, but it would not be a departure from the invention to apply the symbols otherwise, provided the important characteristic of designating the length by their agency is preserved. Said symbols are applied upon or adjacent to the railroad representations end to end, and in each map the symbols so applied are all of equal length. Thus, as they follow the lines of the roads in all the curves of the latter, they serve as a measure of the actual length of the road between any two points.

Being laid off according to the scale of the map and with a length of any predetermined number of units, the mileage between any two points on the road is easily determined with sufficient accuracy for commercial estimation by counting the whole number of symbols lying along the line of the road between such points and estimating or measuring the fractional parts of the symbols at either end which extend beyond either of such points, in cases where the symbols do not terminate exactly at the points between which the calculation is made.

As an illustrative example of the mode of using these symbols for the purpose indicated, let us assume with reference to the railroad shown in the right hand part of Figure 2 that the distance on the railroad between the stations Franklin and Cherryfield is to be determined, and that the symbols *c* are so drawn that the linear distance between the corresponding points of adjacent symbols is ten miles. Then, on this assumption the distance between Franklin and Cherryfield is shown to be twenty miles. In a similar manner the railroad mileage between any two places can be quickly and accurately determined without the trouble of scaling off the total length of what may be an irregular line on the map, or of looking up the mileage in a railway publication.

Although this illustration is given only in connection with railway lines, the same principles are clearly applicable to all other channels for travel or conveyance of goods, such as highways, stage lines, rivers, and canals or other water ways. This part of my invention comprises the placement on or beside the representation of any road or way on a map of elongated distance symbols, each equal in length to one another and arranged end to end, and in a line conforming accurately to the road or way in all the bends of the latter.

The same symbols are used to designate ownership of such roads or ways as are property, or to indicate the operating agency in the case of common carriers in cases where the ways are not property or the designation of the operating agency is more important than that of the ownership of the way.

By comparison of the symbols $b$ and $c$ in Figures 1 and 2 and of the other symbols $d$, $e$, $f$, $g$, etc. in Figure 1 differences in their characteristics will be noted. Thus the symbols $b$ consist of lines with rectangular enlargements at their ends; the symbols $c$ are lines with circular enlargements; those designated $d$ have solid rectangles at one end and open circles at the other end; those designated $e$ have triangles at one end and ovals at the other; those designated $f$ are all of uniform thickness throughout; and those designated $g$ are shaded.

In Figure 3 illustrative examples of different symbols are shown on a somewhat larger scale, whereby to illustrate further the scope for diversity which inheres in the type of symbol which I have devised. By taking as base symbols those which have open enlargements at their ends or open spaces in their central parts, and variously inserting forms or devices which may be here termed "variables" in such spaces, or by wholly or partially filling such spaces with solid color, a large variety of specifically different symbols, founded upon the same base, is provided for. Thus if, for example, $h$ is taken as a base (said symbol having the same form as that above designated as $b$, but formed only in outline with an open space in its interior), then the specific symbol $b$ is formed therefrom by filling in its interior with solid color, and other symbols $i$, $j$, $l$, $m$, $n$, and $o$ are produced by combining therewith various geometric forms or letters. These latter symbols are simply a few illustrating the principles according to which many symbols may be developed from one basic symbol. Other basic symbols are shown at $p$, $q$, $r$, $x$ and $x'$, each of which has an interior open space adapted to be occupied by various forms or devices to make other specific symbols according to the same principle.

This phase of the invention, that is, the one involved in the ownership symbols, is applicable also outside of its function as a means for the indication of distances.

Another phase of the invention is shown in Figure 2 by the symbols or devices $s$ and $t$ beside certain of the place names on the line of the railroad. The latter symbols are designed and applied to give information of the characteristics of the locality or community, particularly those which have to do with natural resources, industries, products of manufacture or trade, or other information of interest and value to shippers, merchants or travelers. That is, by placing symbols according to a conventional code adjacent to the locations on the map of localities in the territory, the predominating characteristics of these localities are made known to persons having occasion to consult the map.

Other features of the map shown in the drawings but not here described form no part of the present invention but are explained in my original parent Patent No. 1,192,829, granted July 25, 1916, and are in part claimed therein and in part in my parent application filed June 23, 1916, Serial No. 105,524.

What I claim and desire to secure by Letters Patent is:

1. A map representing a section of a country and showing thereon the established commercial channels of communication between parts of such section with graphic symbols applied to the indications of such channels and being equal to one another in length and having collectively equal linear extent with said channels, whereby the length between any two points of the channel may be estimated.

2. A map representing a part of the earth's surface and showing thereon channels of transportation with symbols applied adjacent to said channels; said symbols being arranged in series end to end and each having a length representing a predetermined distance on the surface of the earth.

3. A map representing a part of the earth's surface and showing thereon channels of transportation and distance symbols applied upon said channels end to end in sequence conforming to all the departures of said channels from straight lines, said symbols being of equal length each to each and having a length in proportion to the scale of the map covering a prescribed number of linear units.

4. A map showing a portion of the surface of the earth and having thereon graphic representations of commercial channels of communication, and conventional symbols placed end to end in series along the representations of such symbols; each of said symbols having a length which is limited in proportion to the scale of the map to represent a certain distance, and the symbols which are applied to different channels having specific differences from one another whereby to denote the identity of the said different channels.

5. A map showing a portion of the surface of the earth and representing thereon commercial channels of transportation existing in the territory depicted, the map having also applied different symbols, the symbols designating the identity of the respective channels and so placed along the channels as to designate distances between different points thereon.

6. A map showing a portion of the surface of the earth and having thereon graphic representations of commercial channels of transportation, and predetermined conventional symbols placed end to end in series longitudinal of such channels, each of said symbols having a length which is limited to represent a certain distance, and the symbols being further characterized as to form according to a predetermined system so as to indicate the ownership of such channels.

7. A map representing a portion of the earth's surface and having place locations thereon, together with symbols at or adjacent to such locations, which symbols have a code significance indicating certain characteristics of the locality as to products, industry or commerce thereof.

8. In connection with a map, a series of symbols designating distances and identity, said symbols having a common characteristic in that the length of each designates a prescribed distance on the map, and otherwise having individual distinguishing differences.

9. In connection with a map, a series of symbols designating distances and identity, said symbols being alike in length and outline and being different from one another in their interior portions.

In testimony whereof I have affixed my signature.

GEORGE W. R. HARRIMAN.